(12) United States Patent
Tanno et al.

(10) Patent No.: US 11,536,386 B2
(45) Date of Patent: Dec. 27, 2022

(54) FLUID CONTROL DEVICE

(71) Applicant: Fujikin Incorporated, Osaka (JP)

(72) Inventors: Ryutaro Tanno, Osaka (JP); Tsutomu Shinohara, Osaka (JP); Yuya Suzuki, Osaka (JP); Hidenori Kiso, Osaka (JP); Yoshiaki Watanabe, Osaka (JP)

(73) Assignee: Fujikin Incorporated, Osaka (JP)

( * ) Notice: Subject to any disclaimer, the term of this patent is extended or adjusted under 35 U.S.C. 154(b) by 0 days.

(21) Appl. No.: 17/269,520

(22) PCT Filed: Jul. 16, 2019

(86) PCT No.: PCT/JP2019/027964
§ 371 (c)(1),
(2) Date: Feb. 18, 2021

(87) PCT Pub. No.: WO2020/044827
PCT Pub. Date: Mar. 5, 2020

(65) Prior Publication Data
US 2021/0215269 A1     Jul. 15, 2021

(30) Foreign Application Priority Data
Aug. 30, 2018 (JP) .............................. JP2018-161689

(51) Int. Cl.
*F16K 27/02* (2006.01)
*F16K 7/16* (2006.01)
(Continued)

(52) U.S. Cl.
CPC ............ *F16K 27/0236* (2013.01); *F16K 7/16* (2013.01); *F16K 7/17* (2013.01); *F16K 31/1225* (2013.01);
(Continued)

(58) Field of Classification Search
CPC .... F16K 7/17; F16K 31/1266; F16K 27/0236; F16K 31/1225; F16K 37/0066;
(Continued)

(56) References Cited

U.S. PATENT DOCUMENTS 3,027,916 A * 4/1962 Smith .................. F16K 17/087
137/557
4,224,831 A * 9/1980 Nilsson ................ F16H 19/025
74/25
(Continued)

FOREIGN PATENT DOCUMENTS

| CN | 102292625 | 12/2011 |
| JP | H04-93736 | 3/1992 |

(Continued)

*Primary Examiner* — Atif H Chaudry
(74) *Attorney, Agent, or Firm* — Chris Mizumoto

(57) ABSTRACT

A fluid control device, capable of detecting leaks even if the leaks is slight, is provided. The fluid control device includes a valve body in which the flow path is formed, a diaphragm isolating a closed space from the flow path, a bonnet forming the closed space between the diaphragm and providing a penetration hole connected to the closed space and penetrated to be able to vertically move a diaphragm retainer, the diaphragm retainer vertically moving in the penetration hole to press the diaphragm and providing an increased diameter portion not to be removed from the penetration hole, a pressure sensor detecting a pressure inside of the closed space, and an elastic body interposing between the increased diameter portion of the diaphragm retainer and the bonnet inside of the closed space and elastically expanding and deflating between the increased diameter portion of the diaphragm retainer and the bonnet as the diaphragm retainer vertically moves.

8 Claims, 8 Drawing Sheets

(51) Int. Cl.
  *F16K 37/00* (2006.01)
  *G01M 3/28* (2006.01)
  *F16K 7/17* (2006.01)
  *F16K 31/126* (2006.01)
  *F16K 31/122* (2006.01)

(52) U.S. Cl.
  CPC ...... *F16K 31/1266* (2013.01); *F16K 37/0066* (2013.01); *G01M 3/2876* (2013.01)

(58) Field of Classification Search
  CPC .... F16K 7/16; F16K 37/0041; F16K 31/1221; F16K 7/12; F16K 37/005; G01M 3/2876
  See application file for complete search history.

(56) References Cited

U.S. PATENT DOCUMENTS

| | | | |
|---|---|---|---|
| 5,629,106 A * | 5/1997 | Yamada | H01M 50/502 |
| | | | 439/846 |
| 6,256,481 B1 * | 7/2001 | Jeong | H04M 1/0216 |
| | | | 455/575.3 |
| 7,862,002 B2 | 1/2011 | Naitoh et al. | |
| 2004/0230157 A1 * | 11/2004 | Perry | A61M 5/14566 |
| | | | 604/99.02 |
| 2010/0288019 A1 | 11/2010 | Simmons | |
| 2014/0076033 A1 | 3/2014 | Simmons | |
| 2015/0143876 A1 | 5/2015 | Dohi et al. | |
| 2017/0184206 A1 * | 6/2017 | Tokuda | F16K 7/17 |
| 2019/0360887 A1 | 11/2019 | Harada et al. | |

FOREIGN PATENT DOCUMENTS

| | | | | |
|---|---|---|---|---|
| JP | H05-126669 | 5/1993 | | |
| JP | H10-122380 | 5/1998 | | |
| JP | 2008-121859 | 5/2006 | | |
| JP | 2014-21029 | 2/2014 | | |
| WO | 2010135224 | 11/2010 | | |
| WO | WO-2016136427 A1 * | 9/2016 | ........... | F16K 31/122 |
| WO | 2018/150949 | 8/2018 | | |

* cited by examiner (a)

(b)

FLUID CONTROL DEVICE

CROSS-REFERENCE

This application is a national phase of an international application, PCT/JP2019/027964 filed on Jul. 16, 2019, which claims the benefit of Japanese Application No. 2018-161689, filed on Aug. 30, 2018.

TECHNICAL FIELD

The present invention relates to a technique for detecting fluid leakage in a fluid control device.

BACKGROUND ART

Conventionally, a film forming process to form thin films on surfaces of semiconductor wafers required a precise control of film thickness, and in recent years a film forming method called ALD (Atomic Layer Deposition) has been used for forming a thin film with an atomic or molecular level thickness.

However, such a film forming process requires a fluid controller, which supplies fluid to a film forming apparatus, to perform switching operations at a very high frequency, and such load can cause fluid to leak or the like more easily. Therefore, there is a high demand for technology that can easily detect fluid leakage in a fluid controller.

Further, because highly reactive and extremely toxic gas is used in semiconductor manufacturing processes, it is important to be able to remotely detect leaks while the leaks are small.

On this point, Patent Document 1 discloses a seal portion damage detection mechanism including a hole formed on the outer surface of a controller for controlling the flow rate of fluid and a leak detection member attached to the hole, where the hole communicates with a gap in the controller. The leak detection member includes a cylindrical body attached to the hole and a movable member provided in the cylindrical body, and the movable member is proposed to be movable outward of the cylindrical body by the pressure of the leaked fluid filled in the gap in the controller.

Further, Patent Document 2 discloses a controller with a seal portion damage detection mechanism including a hole formed on the outer surface of the controller for controlling the flow rate of fluid and a leak detection member attached to the hole, where the hole communicates with the space in the controller, and the leak detection member is sensitive to the presence of a specific fluid.

Furthermore, Patent Document 3 discloses a leak detection device for detecting a fluid leak. It proposed a device including a sensor holding body, an ultrasonic sensor held by the sensor holding body to face a leak port that communicates with the outside, a sealed portion provided in the leak detection target member, an ultrasonic wave path provided between the sensor surface of the ultrasonic sensor and the leak port, and a circuit for processing ultrasonic waves obtained by the ultrasonic sensor.

CITATION LIST

Patent Documents

Patent Document 1: JP 04-093736 A
Patent Document 2: JP 05-126669 A
Patent Document 3: JP 2014-21029 A

SUMMARY OF INVENTION

Technical Problem

However, in the seal portion damage detection mechanism described in Patent Document 1, although the pressure of the gap in the controller can be determined but not the negative pressure, and when the leakage of the fluid is slight, there is a possibility that the movable member does not move sufficiently and the leak cannot be detected.

Further, in the controller with a seal portion damage detection mechanism described in Patent Document 2, when fluid leakage is slight, there is a possibility that the leak detection member may not be responsive because of dilution with purge gas, and there is also a possibility that the leakage detection member does not respond to a predetermined fluid.

Furthermore, in the leak detection device described in Patent Document 3, when the leakage of fluid is slight, the ultrasonic wave can be weak and the leakage may not be detected.

Thus, an object of the present invention is to provide a fluid control device capable of detecting a leak accurately even when the leak of the fluid is slight.

Solution to Problem

In order to achieve the above objects, a fluid control device according to one aspect of the present invention is the fluid control device, detecting pressure in a closed space isolated from a flow path, and having a valve body in which the flow path is formed, an isolation member allowing or blocking fluids in the flow path and isolating the closed space from the flow path, a bonnet arranged on the valve body, forming the closed space between the isolation member, and providing a penetration hole connected to the closed space and penetrated to be able to vertically move a diaphragm retainer, the diaphragm retainer vertically moving in the penetration hole to press the isolation member and providing an increased diameter portion not to be removed from the penetration hole, a pressure sensor detecting a pressure inside of the closed space, and an elastic body interposing between the increased diameter portion of the diaphragm retainer and the bonnet inside of the closed space and elastically expanding and deflating between the increased diameter portion of the diaphragm retainer and the bonnet as the diaphragm retainer vertically moves.

Further, the bonnet may be provided with a storing part opening on a side of the closed space and storing the elastic body, and the elastic body may expand and deflate as the diaphragm retainer vertically moves and may elastically deform during compression to be stored in the storing part.

Further, the storing part may be configured as an increased diameter portion, among the penetration hole, in a vicinity of the closed space, and the elastic body may seal an inner peripheral surface of the penetration hole and the diaphragm retainer.

Further, the elastic body may form a gap on a side opposite to the closed space and be stored in the storing part at a natural state.

Further, a position of the increased diameter portion of the diaphragm retainer, vertically moving in the closed space, may define a top dead center of a piston interlocked with the diaphragm retainer.

Further, a sealing member, sealing an inner peripheral surface of the penetration hole and the diaphragm retainer in a vicinity of the closed space, may be included.

Effect of the Invention

According to the present invention, the fluid control device can detect a leakage accurately even when the leakage of fluid is slight.

PREFERRED EMBODIMENT

Example 1

Figure 1:
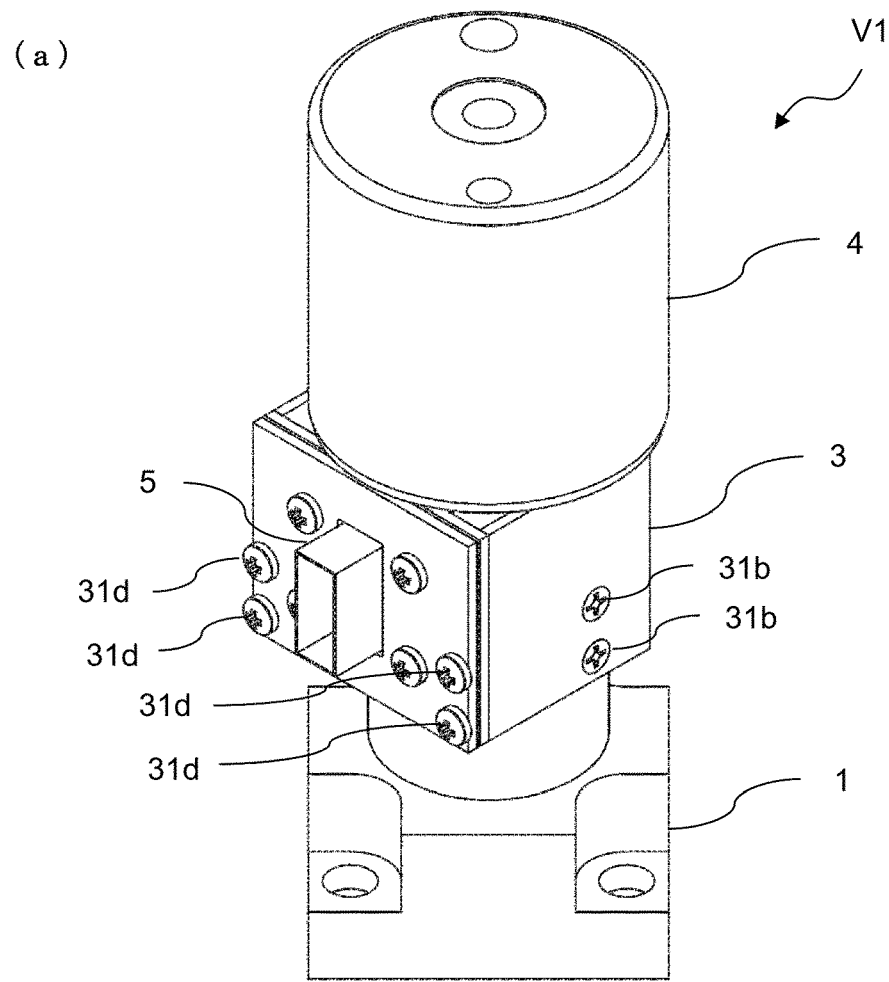
FIG. 1 is a diagram illustrating (a) an external perspective view and (b) a plan view of the fluid control device according to a first embodiment of the present invention.
Figure 1:
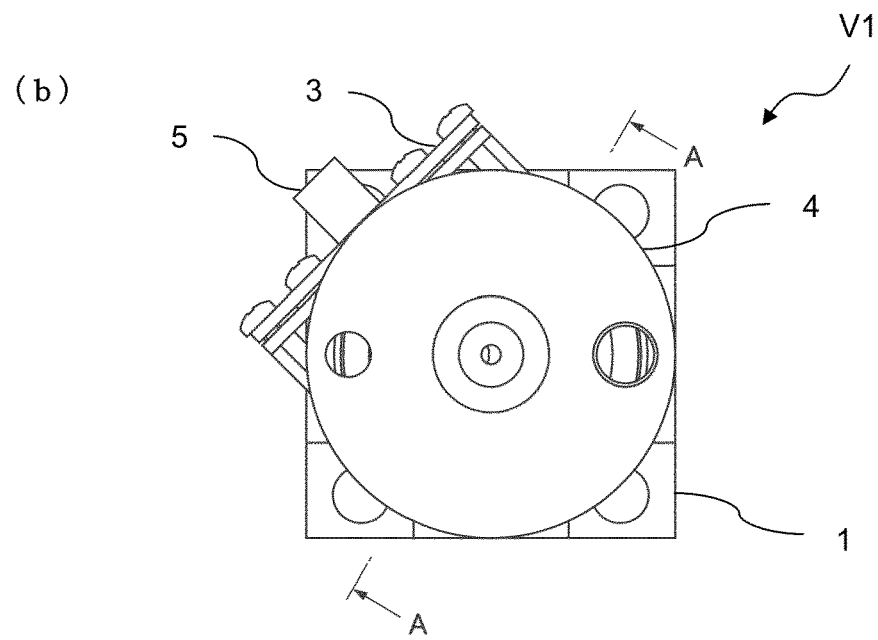

A fluid control device according to an embodiment of the present invention will be described below with reference to the drawings.

In the following description, the directions of members and the like may be referred to as upper, lower, left, and right depending on the directions in the drawings for the sake of convenience, but these do not limit the directions of members or the like in the actual situation or an embodiment of the present invention.

As illustrated in FIG. 1, a fluid control device V1 according to the present embodiment is a device capable of detecting an internal operation by an internal sensor and can detect abnormality of the fluid control device V1 based on a detected information, particularly a leakage of fluid within the fluid control device V1. Further, this fluid control device V1 is connected to an external terminal and provides information related to the abnormality of the fluid control device V1 and detected by the sensor to the external terminal.

In a practical use of the fluid control device V1, a plurality of fluid control devices V1 are integrated with other flow rate control devices to form a fluid control apparatus (gas box).

Figure 2:
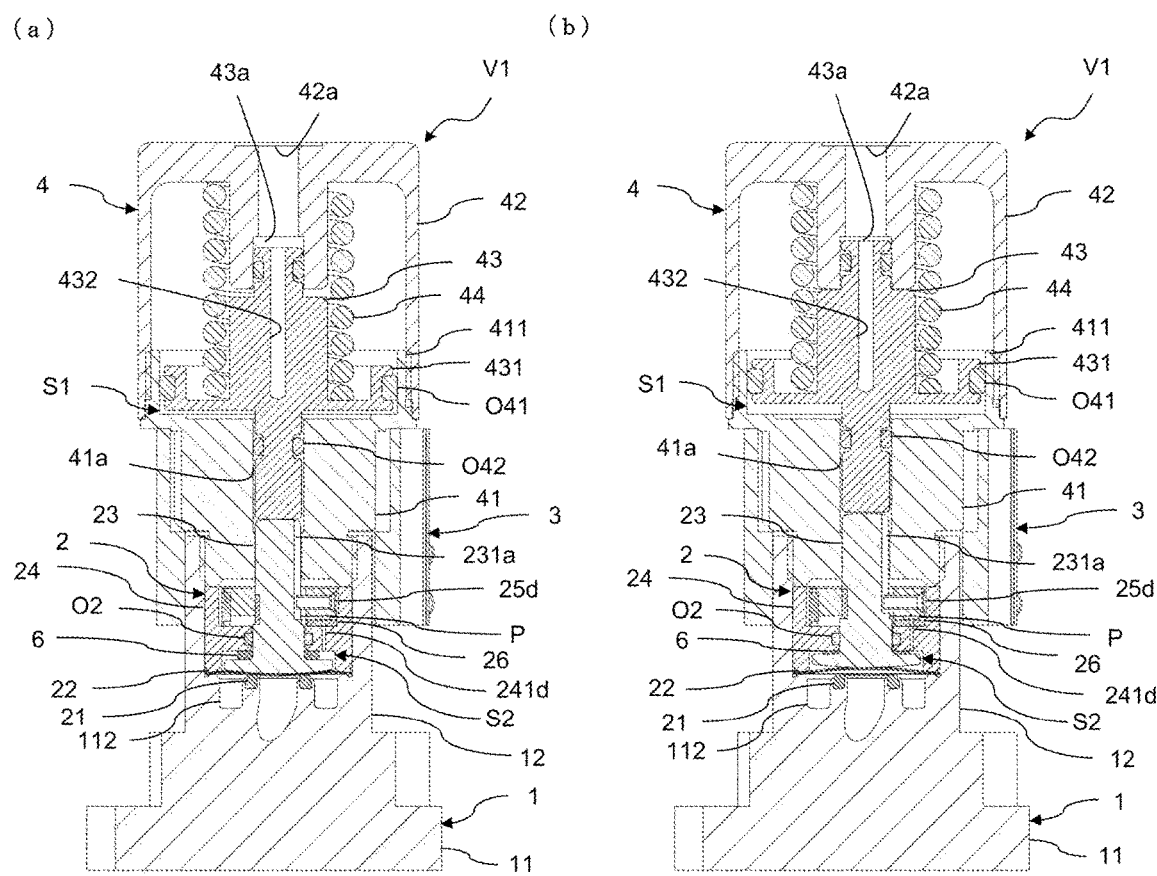
FIG. 2 is a diagram illustrating a cross-sectional view taken along line A-A of an internal structure of the fluid control device according to a first embodiment of the present invention, and (a) is illustrating a closing valve state and (b) is illustrating an opening valve state.

The fluid control device V1 according to the present embodiment is an air-operated direct diaphragm valve, as illustrated in FIG. 1 and FIG. 2, and includes a valve body 1, a bonnet part 2, a cover part 3, and an actuator part 4.
Valve Body 1

Figure 3:
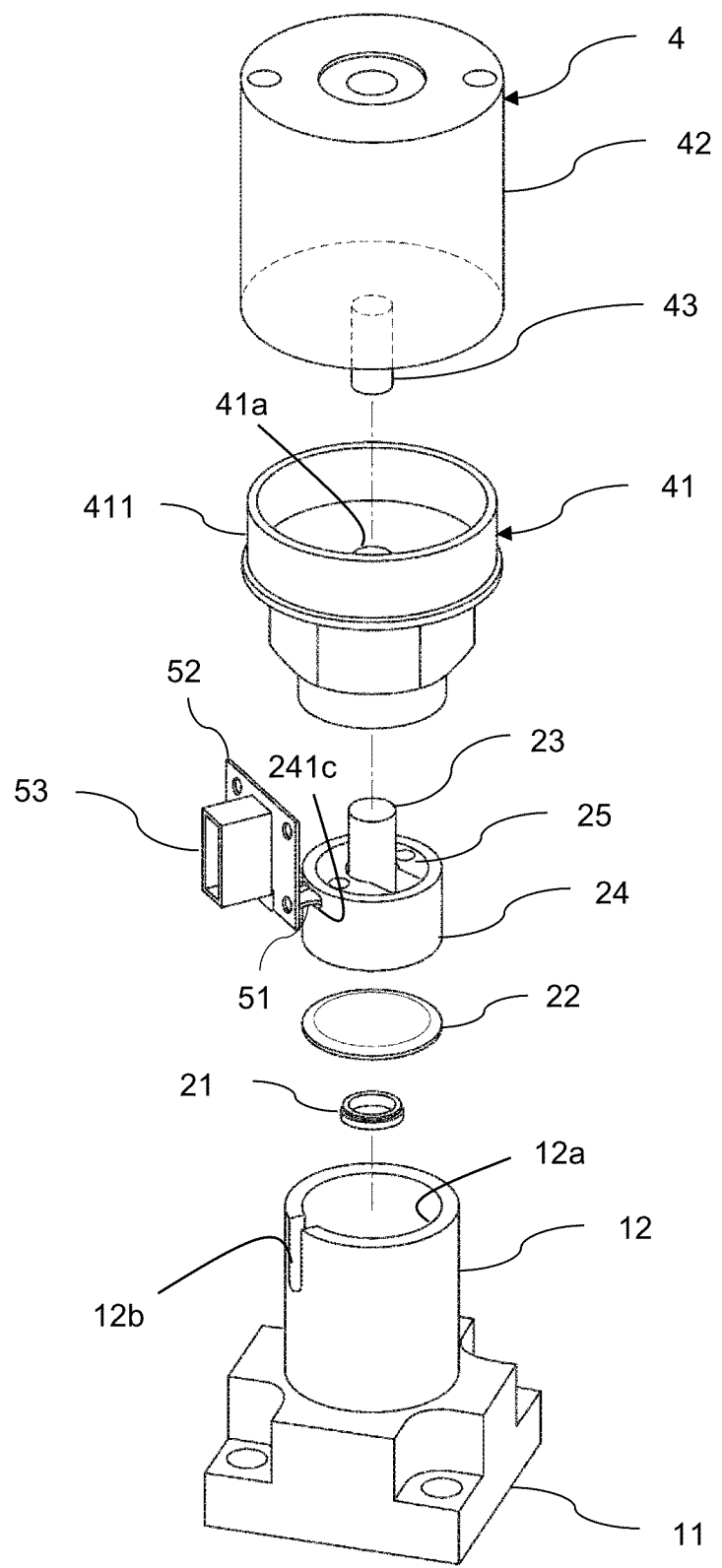
FIG. 3 is a diagram illustrating an exploded perspective view of the fluid control device according to a first embodiment of the present invention.

The valve body 1, as illustrated in FIG. 2 and FIG. 3, includes a base 11 where a flow path is formed and a cylindrical part 12 of substantially cylindrical shape provided on the base 11.

The base 11 is a rectangular shape in a plan view and becomes a part located on a substrate or a manifold block when it configures a fluid control apparatus unitized by a plurality of fluid control device V1.

The cylindrical part 12 is a hollow shape with an open end face on a side where the bonnet part 2 is arranged, and an inside of the hollow constitutes a recess 12a storing the bonnet part 2.

This cylindrical part 12 has a slit 12b, which has a length in an axial direction, which opens on one side opposite to the base 11 and at a side where the bonnet part 2 is placed, and which is penetrated to a side of the recess 12a from the outside. A flexible cable 51 extending from a bonnet wall 25 through this slit 12b is led out from the inside to the outside.

Below the recess 12 a and the inside of the base 11, an inflow path where a fluid flows in, an outflow path where the fluid flows out, and a valve chamber 112 connecting with the inflow path and the outflow path, are formed. The inflow path, the outflow path, and the valve chamber 112 integrally constitute a flow path where the fluid flows.
Bonnet Part 2

Figure 4:
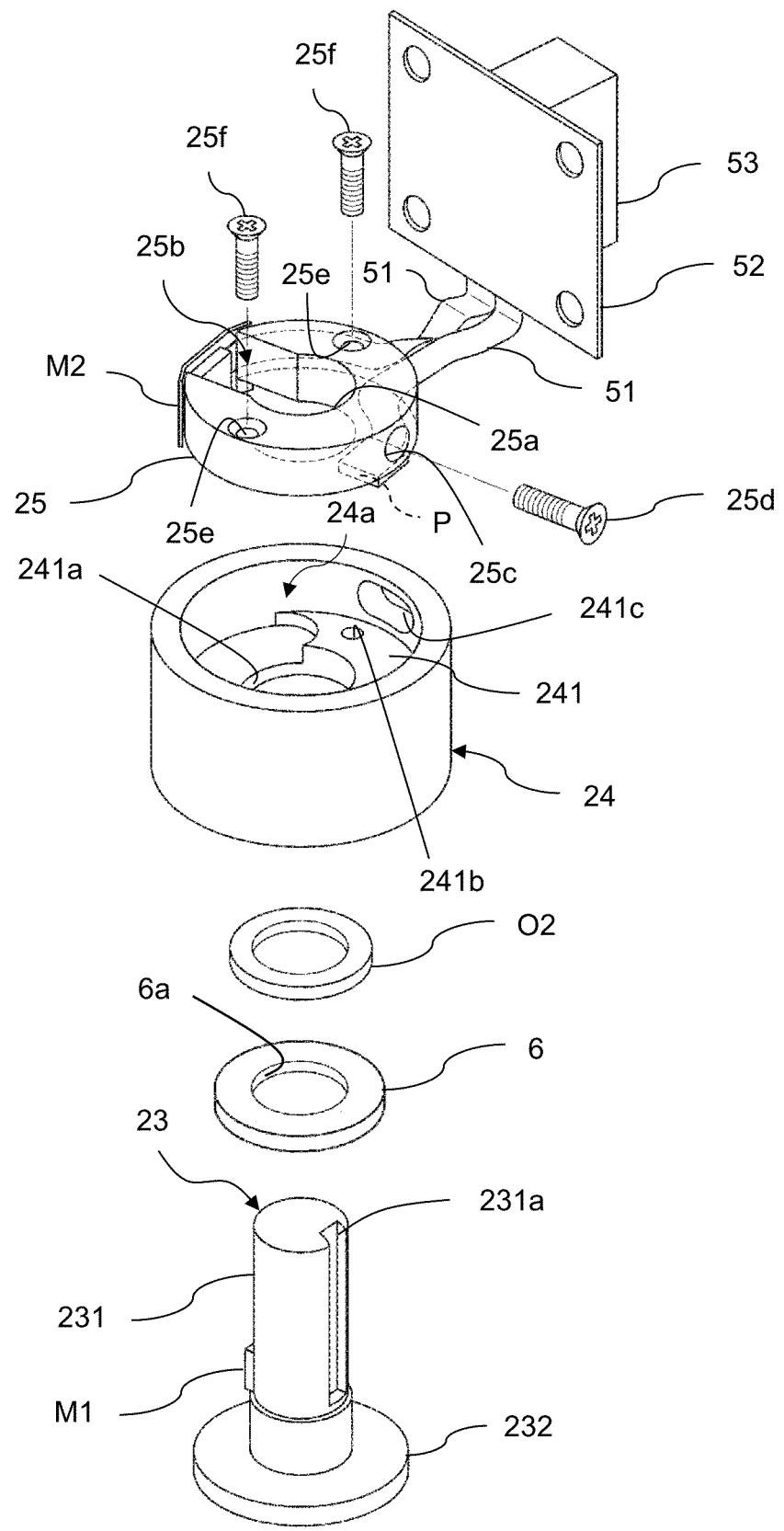
FIG. 4 is a diagram illustrating an exploded perspective view of the fluid control device according to a first embodiment of the present invention.

The bonnet part 2, as illustrated in FIGS. 2 to 4, is placed in a state of being stored in the inside of the recess 12a of the valve body 1.

This bonnet part 2 includes a seat 21, a diaphragm 22, a diaphragm retainer 23, a bonnet 24, and the bonnet wall 25, and also includes an elastic body 6 for improving a detection accuracy of a pressure change due to fluid leaks.

The annular seat 21 is provided on an open periphery of an inflow path in a valve chamber 112. By making the seat 21 brought into contact with and detached from the diaphragm 22, the fluid can flow from the inflow path to an outflow path, or the flow can be blocked.

The diaphragm 22 is made of metal such as stainless steel or a NiCo-based alloy, is a spherical shell-shaped member with a convex central part, and separates the flow path from a space where the actuator part 4 operates. When the diaphragm 22 is not pressed by the diaphragm retainer 23, the diaphragm 22 is detached from the seat 21 as illustrated in FIG. 2(b), and the inflow path and the outflow path are connected to allow the flow of the fluid. On the other hand, in a state of being pressed by the diaphragm retainer 23, as illustrated in FIG. 2(a), a central part of the diaphragm 22 is deformed and brought into contact with the seat 21, and the inflow path and the outflow path are blocked to block the flow of the fluid.

The diaphragm retainer 23 is provided on an upper side of the diaphragm 22 and presses the central part of the diaphragm 22 in conjunction with a vertical move of a piston 43.

This diaphragm retainer 23 includes a substantially cylindrical base body 231 and an increased diameter portion 232, where a diameter is increased at one end side that is brought into contact with the diaphragm 22.

A groove 231a, having a length in an axial direction and one end open on a side opposite to the increased diameter portion 232, with a bottom is formed on the base body 231. A shank part of a screw 25d, screwed into a screw hole 25c of the bonnet wall 25, fits slidably within this groove 231a. The groove 231a and the screw 25d constitute a rotation regulator regulating circumferential rotation of the diaphragm retainer 23. As a result, the diaphragm retainer 23 is regulated the circumferential rotation while vertically moving in conjunction with the piston 43.

A magnet M1 constituting a magnetic sensor is installed in the base body 231. This magnet M1 constitutes the magnetic sensor, described later, with a magnetic body M2, installed on the bonnet wall 25. In this embodiment, the magnet M1 is installed on an opposite side of the groove 231*a* of the base body 231, but it is also possible to install on other position of the base body 231 as long as there is no problem in constituting the magnetic body M2 and the magnetic sensor.

The increased diameter portion 232 is a substantially disk-shaped portion having a diameter larger than a diameter of a penetration hole 241*a* of the bonnet 24, and is located inside of the closed space S2 so that the diaphragm retainer 23 may not be removed from the penetration hole 241*a*.

Further, the increased diameter portion 232 compresses the elastic body 6 with a partition 241 of the bonnet 24 in accordance with a vertical move of the diaphragm retainer 23 in conjunction with the piston 43.

A width of the increased diameter portion 232 is suitable to be a minimum width that that the diaphragm retainer 23 cannot be pulled out from the penetration hole 241*a* and the elastic body 6 can be compressed with the partition 241 of the bonnet 24. By setting the width of the increased diameter portion 232 to such a width and by reducing a width or a diameter of the closed space S2 provided on a lower surface side of the partition 241 of the bonnet 24 in accordance with the width or the diameter of the increased diameter portion 232, a volume of the closed space S2 can be reduced.

The diaphragm retainer 23 having such a configuration defines a top dead center of the piston 43 that vertically moves in accordance with an opening and closing of the fluid control device V1. In other words, when the valve is opened, an upper surface of the increased diameter portion 232 of the diaphragm retainer 23 is compressed and put in the elastic body 6 with the partition 241 of the bonnet 24. At this time, a position that the elastic body 6 is maximally compressed by the driving pressure forms the top dead center.

As a result, unlike a case that other position forms the top dead center of a vertical movement of the piston 43, it is not necessary to allow a margin at the position where the increased diameter portion 232 of the diaphragm retainer 23 reaches when the valve is opened, and the volume of the closed space S2 can be minimized.

The bonnet 24 has a substantially cylindrical shape, is arranged on the valve body 1, and forms the closed space with the diaphragm 22.

The bonnet 24 supports the diaphragm 22 between the valve body 1 at a lower end part, and the diaphragm 22 and the valve body 1 are sealed by this part.

Further, a substantially disk shaped partition 241, where the penetration hole 241*a* is formed in a center and the diaphragm retainer 23 is penetrated to the penetration hole 241*a* to be vertically movable, is provided inside of the bonnet 24.

The bonnet wall 25 is stored in a recess 24*a* formed above the partition 241 or on a side where the actuator part 4 is arranged. Screw holes 241*b* and through holes 25*e* are provided in each of the partition 241 and the bonnet wall 25 at positions corresponding to each other, and the bonnet wall 25 is screwed into the bonnet 24 by bolts 25*f*.

The partition 241 of the bonnet 24 has a certain thickness, and an O-ring O2, as a sealing member, is interposed between an inner peripheral surface of the penetration hole 241*a* formed in the partition 241 and the diaphragm retainer 23. As a result, an airtightness of a space defined by the partition 241, the diaphragm 22, and the diaphragm retainer 23 is ensured.

Here, the O-ring O2 for ensuring the airtightness of the closed space S2 is provided near the closed space S2 in an operating direction of the diaphragm retainer 23 which vertically moves. As a result, an interval from an opening on a side of the closed space S2 of the penetration hole 241*a* to the O-ring O2 is eliminated as much as possible to reduce the volume of the closed space S2.

The near the closed space S2 referred here is at least a position biased toward the closed space S2 rather than a side where the diaphragm retainer 23 is brought into contact with the piston 43, and more preferably, is a position where a minimum distance between the O-ring O2 and the increased diameter portion 232 of the diaphragm retainer 23 can be maintained without contacting each other.

Further, a connection hole 241*d*, connected to a pressure sensor P installed in the bonnet wall 25, is provided in the partition 241 of the bonnet 24. Since the pressure sensor P is provided through the connection hole 241*d*, a pressure inside of a closed space S2 defined by the partition 241, the diaphragm 22, and the diaphragm retainer 23, is possible to be measured.

Furthermore, on a side of the bonnet 24, a through hole 241*c* is provided for leading the flexible cable 51, leading from the bonnet wall 25 stored inside, to the outside.

The bonnet wall 25 is a member arranged in the bonnet 24. This bonnet wall 25 has a shape that is a thick substantially disk-shaped member hollowed out in a C-shape in a plan view. In a center of the bonnet wall 25, a penetration hole 25*a* is provided to penetrate the base body 231 of the diaphragm retainer 23. In addition, an opening 25*b* is provided to opens the penetration hole 25*a* to an outward in a radial direction of the bonnet wall 25.

The screw hole 25*c*, threaded outward in a radial direction from the penetration hole 25*a*, is formed at a predetermined location of a thick part of the bonnet wall 25. The screw 25*d* is screwed into this screw hole 25*c* from the outside, and an axial part of the screwed screw 25*d* comes out to the penetration hole 25*a* and slidably fits to the groove 231*a* of the diaphragm retainer 23 penetrated to the penetration hole 25*a*.

The through hole 25*e* is provided in the bonnet wall 25 at a position corresponding to the screw hole 241*b* of the bonnet 24. The bolt 25*f* is screwed into the screw hole 241*b* and the through hole 25*e* with the bonnet wall 25 arranged on the partition 241 of the bonnet 24, whereby the bonnet wall 25 is fixed to the bonnet 24.

A flat plate-shaped magnetic body M2, fixed to lay and close the opening 25*b*, is installed close to the opening 25*b* of an outer peripheral surface of the bonnet wall 25. This magnetic body M2 constitutes the magnetic sensor described later with the magnet M1 installed in the diaphragm retainer 23.

Elastic Body 6

The elastic body 6 is a member that elastically expands and deflates in response to an external force and is made of a porous soft resin or the like having an external surface coated with a non-porous material. Further, in this embodiment, the penetration hole 6*a*, which is formed in a ring shape having a certain thickness and in which the base body 231 of the diaphragm retainer 23 is penetrated in a center, is provided.

The elastic body 6 is interposed between the increased diameter portion 232 of the diaphragm retainer 23 and the partition 241 of the bonnet 24 while the base body 231 of the diaphragm retainer 23 is penetrated in the penetration hole 6*a*, and elastically expands and deflates as the diaphragm retainer 23 vertically moves. In other words, when the valve of the fluid control device V1 is opened and the diaphragm retainer 23 is detached from the diaphragm 22, it is compressed and deflated between the increased diameter portion 232 of the diaphragm retainer 23 and the partition 241 of the bonnet 24. On the other hand, when the valve of the fluid control device V1 is closed, the diaphragm retainer 23 is brought into contact with the diaphragm 22, and the increased diameter portion 232 of the diaphragm retainer 23 is detached from the partition 241 of the bonnet 24, it is released from the compressed state, expands, and returns to a natural state before the compression.

As a result, a volume of gas occupied in the closed space S2 can be reduced by an amount of the elastic body 6 of the fluid control device V1.

In the present embodiment, the elastic body 6 is formed in the ring shape so that the diaphragm retainer 23 can be inserted into the penetration hole 6a, but regardless of this, it may have other shapes as long as it is interposed between the increased diameter portion 232 of the diaphragm retainer 23 and the partition 241 of the bonnet 24 and elastically expands and deflates. For example, an outer shape may be rectangular, or may be configured as an aggregation of a plurality of elastic members.

Cover Part 3

Figure 5:
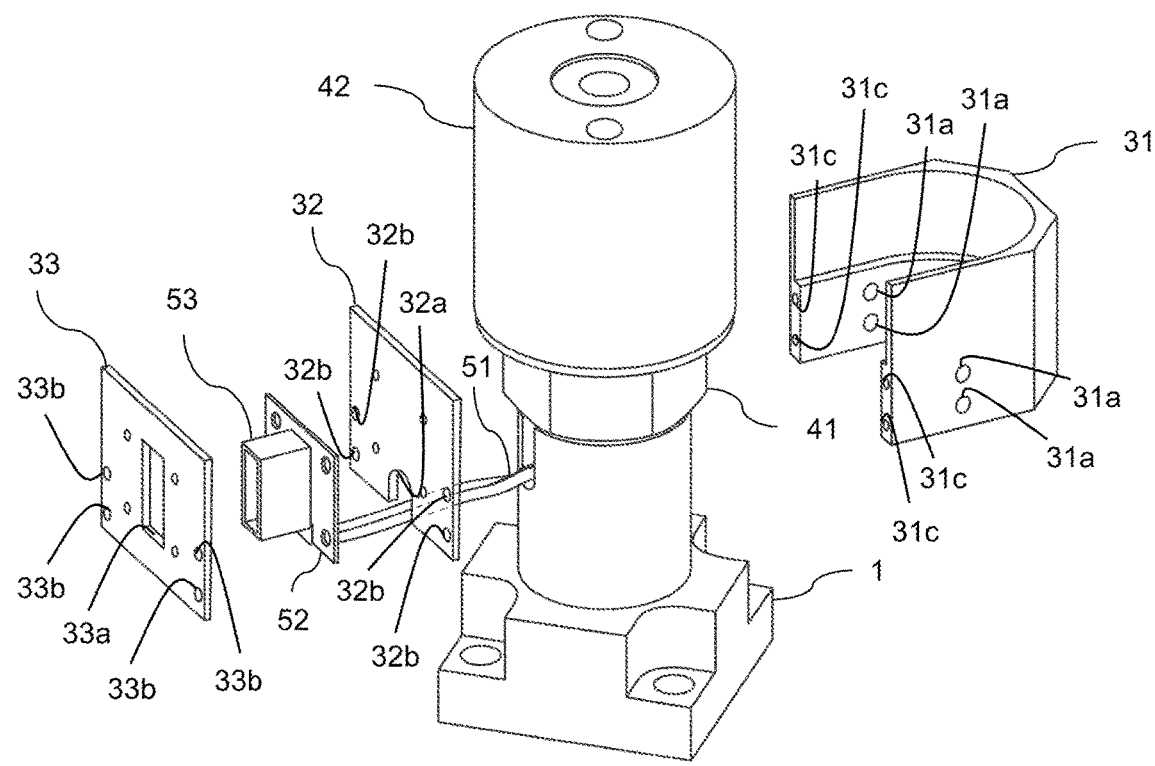
FIG. 5 is a diagram illustrating an exploded perspective view of the fluid control device according to a first embodiment of the present invention.

The cover part 3, as illustrated in FIG. 1 and FIG. 5, compresses and integrally holds an actuator body 41 and the valve body 1, and constitutes a fastener fastening a circuit board 52 and a connector 53, provided in the circuit board 52, to the fluid control device V1.

This cover part 3 includes a cover 31 and flat plates 32 and 33.

The cover 31 is a substantially U-shaped, and the actuator body 41 and an end part of the valve body 1 is fitted inside of the cover 31.

Screw holes 31a are provided on both side of the cover 31 corresponding to positions where the actuator body 41 is fitted. As a result, when the screw 31b is screwed into the screw hole 31a with the valve body 1 fitted inside and a tip of the screw 31b is pressed against the valve body 1, the inside of the cover 31 is able to support the valve body 1 from both sides thereof.

Furthermore, the screw holes 31c are provided in a thick part of the cover 31. The plates 32 and 33 are installed to the cover 31 by screwing the screws 31d into the screw holes 31c via the through holes 32b and 33b of the plates 32 and 33.

The plates 32 and 33 are screwed and fixed to the cover 31 while the actuator body 41 and the end part of the valve body 1 are fitted inside of the cover 31, and compresses and holds the actuator body 41 and the valve body 1 between the cover 31 in the fixed state.

A notch 32a cut out a tongue-shape is formed below the plate 32, and the flexible cable 51 is lead via this notch 32a to the circuit board 52, where the connector 53 is provided.

The plate 33 is screwed and fixed to the plate 32 and the cover 31 while the circuit board 52 is interposed between the plate 32 and 33, and compresses and holds the circuit board 52 between the plate 32 and 33.

The plate 33 is provided with a substantially rectangular shaped through hole 33a in a central part, and the connector 53 provided in the circuit board 52 is lead to the outside from this through hole 33a.

The base 11 is in a rectangular shape in a plan view, and the cover part 3, as illustrated in FIG. 1(b), fixes the connector 53 to the fluid control device V1 in a diagonal direction of the rectangular base 11. The reason for fixing the connector 53 in this direction is as follows. When constituting the fluid control apparatus (a gas box) unitized by a plurality of fluid control device V1, it is preferable to align a direction of adjacent rectangular base 11 to eliminate interval as much as possible, and it is preferable to arrange the fluid control device V1 on a substrate or a manifold block due to a demand for integration. On the other hand, when they are arranged and integrated in this way, it becomes difficult to connect terminals or the like to the connector 53. Thus, by directing the connector 53 in the diagonal direction of the base 11, it is possible to take a wider space for connection compared to direct to the fluid control device V1, located right next to it. As a result, it is easy to connect terminals and the like to the connector 53, it is possible to prevent problems such as disconnection due to broken or twisted terminals and the like, and it is possible to prevent problems that terminals come into contact with the fluid control device V1 to cause an abnormality in an operation of the fluid control device V1.

Actuator Part 4

The actuator part 4 is arranged above the bonnet part 2. This actuator part 4, as illustrated in FIG. 2, includes the actuator body 41, an actuator cap 42, a piston 43, and a spring 44. Although the internal structure of the actuator part 4 is omitted in FIG. 3, the internal structure is as illustrated in FIG. 2.

The actuator body 41 is interposed between the piston 43 and the bonnet 24.

As illustrated in FIG. 3, the actuator body 41 has a substantially cylindrical shape, and a penetration hole 41a where the piston 43 and the diaphragm retainer 23 is penetrated is provided along a length direction at a center. As illustrated in FIG. 2, the piston 43 is brought into contact with the diaphragm retainer 23 in the penetration hole 41a, and the diaphragm retainer 23 vertically moves in conjunction with a vertical move of the piston 43.

A peripheral wall 411 having an annular projection is formed on an upper end surface on a side where the piston 43 of the actuator body 41 is arranged, and a driving pressure introduction chamber S1, where a driving pressure is introduced, is formed between a flat horizontal surface inside of the peripheral wall 411 and a lower end surface of the increased diameter portion 431 of the piston 43.

Further, an external thread is threaded on an outer peripheral surface of a side where the piston 43 of the actuator body 41 is arranged, and the actuator body 41 is installed to one end of the actuator cap 42 by screwing the external thread to an internal thread threaded on an inner peripheral surface of the actuator cap 42.

A center of a length direction of the actuator body 41 is formed a substantially hexagonal shape in cross sectional view, an upper end part of the substantially hexagonal shape in cross sectional view and the valve body 1 are integrally compressed by the cover 31.

The actuator cap 42 is a cap-shaped member, having an open lower end, and stores the piston 43 and the spring 44 inside.

An opening 42a, connecting to a driving pressure introduction path 432 of the piston 43, is provided in an upper end surface of the actuator cap 42.

A lower end of the actuator cap 42 is closed by screwing an upper part of the actuator body 41.

The piston 43 vertically moves in conjunction with supplying and stopping of the driving pressure, and the diaphragm 22 is brought into contact with and detached from the seat 21 through the diaphragm retainer 23.

A substantially center in an axial direction of the piston 43 is expanded in a disk-shape and constitutes the increased diameter portion 431. The piston 43 receives a bias of the spring 44 on an upper surface of the increased diameter portion 431. Further, a driving pressure introduction chamber S1 where the driving pressure is supplied is formed on a lower end of the increased diameter portion 431.

Furthermore, the driving pressure introduction path 432 is provided inside of the piston 43 to connect the opening 43a, formed on an upper end surface, and the driving pressure introduction chamber S1, formed on a lower end. The opening 43a of the piston 43 is connected to the opening 42a of the actuator cap 42, an introduction pipe introducing the driving pressure from the outside is connected to the opening 42a, and the driving pressure is supplied to the driving pressure introduction chamber S1 as a result.

An O-ring O41 is installed on an outer peripheral surface of the increased diameter portion 431 of the piston 43, and the O-ring O41 seals an outer peripheral surface of the increased diameter portion 431 and the peripheral wall 411 of the actuator body 41. Further, the O-ring O42 is installed on a lower end of the piston 43, and the O-ring O42 seals an outer peripheral surface of the piston 43 and an inner peripheral surface of the penetration hole 41a of the actuator body 41. The driving pressure introduction chamber S, connected to the driving pressure introduction path 432 in the piston 43 is formed by these O-rings O41 and O42, and an airtightness of this driving pressure introduction chamber S1 is ensured.

The spring 44 is wound around an outer peripheral surface of the piston 43, is brought into contact with an upper surface of the increased diameter portion 431 of the piston 43, and biases the piston 43 in a downward, such as pushing down the diaphragm 22, direction.

An opening/closing operation of the valve accompanying a supply and a stop of the driving pressure is mentioned. When air is supplied from the introduction pipe (not illustrated in figures) connected to the opening 42a, the air is lead to the driving pressure introduction chamber S1 via the driving pressure introduction path 432 in the piston 43. In response, the piston 43 is pushed upward against the bias of the spring 44. As a result, the diaphragm 22 is detached from the seat 21, the valve is opened, and the fluid flows. On the other hand, when the air is not lead to the driving pressure introduction chamber S1, the piston 43 is pushed downward according to the bias of the spring 44. As a result, the diaphragm 22 comes into contact with the seat 21, the valve is closed, and the fluid is blocked.

Sensor

The fluid control device V1 includes the pressure sensor P and the magnetic sensor, having the magnet M1 and the magnetic body M2, as a sensor for detecting the operation in the device.

The pressure sensor P, as illustrated in FIG. 2, is installed to a lower surface of the bonnet wall 25 or a side of the flow path. The pressure sensor P is connected to the closed space S2 defined by the diaphragm 22, the partition 241, and the diaphragm retainer 23, of the bonnet 24 via the connection hole 241d. This pressure sensor P is constituted by a pressure-sensitive element, detecting a pressure change, and a conversion element and the like, converting a detected value of the pressure detected by the pressure-sensitive element to an electric signal. As a result, the pressure sensor P is possible to detect the pressure in the space defined by the diaphragm 22, the partition 241, and the diaphragm retainer 23, of the bonnet 24.

A packing 26 is interposed at a position where the pressure sensor P is connected to the connection hole 241d to ensure the airtightness.

The pressure sensor P may detect either a gauge pressure or an atmospheric pressure, and a threshold value referred by a discrimination processing unit 71 (described later with reference to FIG. 6) may be set according to each case.

Further, in the present embodiment, the pressure change in the closed space S2 is detected by the pressure sensor P to detect the abnormality of the fluid control device V1 caused by fluid leaks and the like, but the condenser type microphone unit may be used as the pressure sensor P. That is, the condenser type microphone unit has a vibration plate vibrating in response to sound waves and a counter electrode arranged to face the vibration plate, and a change in capacitance between the vibration plate and the counter electrode is converted into a change in voltage to be an audio signal. Then, this condenser type microphone unit becomes omnidirectional (nondirectional) by closing the air chamber provided on a back side of the vibration plate. In the case of the omnidirectional, since the condenser type microphone unit operates by capturing changes in sound pressure due to sound waves from all directions, the condenser type microphone unit can be used as the pressure sensor.

A magnetic body M2 is installed to the opening 25b of the bonnet wall 25, and this magnetic body M2 constitutes the magnetic sensor with the magnet M1 installed to the diaphragm retainer 23.

With this magnetic sensor, the opening/closing operation of the valve is possible to be detected as follows. While the magnet M1 slides in response to the vertical movement of the diaphragm retainer 23, the magnetic body M2 is fixed to the inside of the valve body 1 with the bonnet wall 25 and the bonnet 24. As a result, it is possible to detect the operation of the diaphragm retainer 23 and the opening/closing operation of the valve based on changes in a magnetic field generated between the magnet M1, which is vertically moving in accordance with the vertical move of the diaphragm retainer 23, and the magnetic body M2 with a fixed position.

The magnetic sensor is used in this embodiment, but the present invention is not limited to this, and other types of sensors such as an optical positioning sensor may be used in other embodiments.

Each of the pressure sensor P and the magnetic sensor is connected to one end of the flexible cable 51 for communication having flexibility (the magnetic sensor is connected to the magnetic body M2 in detail), and the other end of the flexible cable 51 is connected to the circuit board 52 provided on the outside of the fluid control device V1.

In this embodiment, a processing module 7 (described later with reference to FIG. 6) executing a predetermined information processing is included in the circuit board 52. The processing module 7 executes a process of detecting an abnormality in the fluid control device V1 based on the information acquired from the pressure sensor P and the magnetic sensor. Then, the circuit board 52 is provided with a substantially rectangular-shaped connector 53 for connecting external terminals. As a result, it is possible to extract data measured by the pressure sensor P and the magnetic sensor.

In the present embodiment, a flexible printed circuits (FPC) is used for the flexible cable 51 and the circuit board 52, and flexible cable 51, circuit board 52, and connector 53 are integrally configured. By using the flexible printed circuits to the flexible cable 51 and the circuit board 52, it is possible to use a space between the members as a wiring path. As a result, it is possible to reduce the size of the fluid control device V1 itself as compared to using covered wires.

Further, the processing module 7 may be stored in the fluid control device V1 separately from the circuit board 52, or may be configured as a part of the pressure sensor P or the magnetic sensor.

In addition, types and shapes of the connector 53 can be appropriately designed according to various standards.

Since the fluid control device V1 having the above configuration can reduce the volume in the closed space S2 by the amount of the elastic body 6, the pressure change in the closed space S2 can be accurately detected. As a result, it is possible to detect abnormalities caused by damage to the diaphragm 22, such as slight fluid leaks from the flow path to the closed space S2.

Software Configuration

In the fluid control device V1 having the above configuration, an example of a process to discriminate the abnormality of the fluid control device V1 based on the pressure change inside of the closed space S2 will be described.

Figure 6:
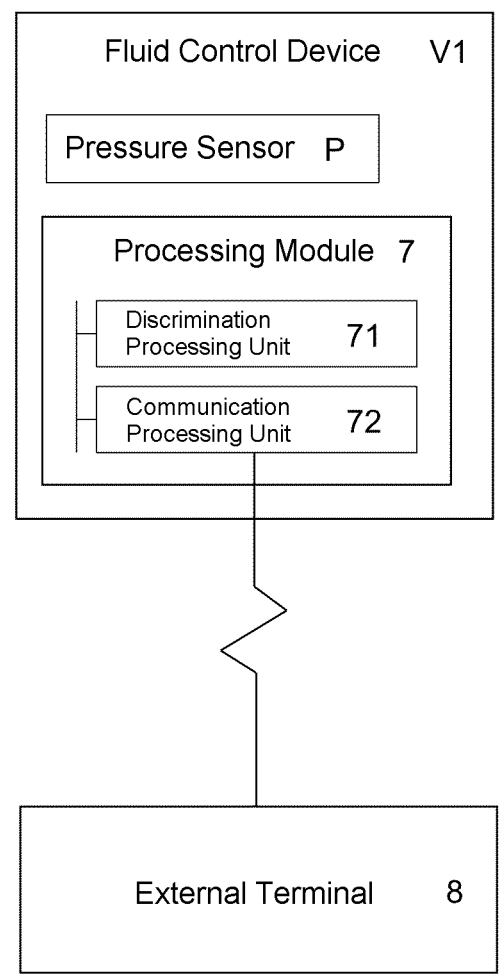
FIG. 6 is a functional block diagram showing functions of the fluid control device according to a first embodiment of the present invention.

The processing module 7 has an arithmetic circuit and a memory provided on the circuit board 52, and as illustrated in FIG. 6, the processing module 7 has a functional block including the discrimination processing unit 71 and a communication processing unit 72. The processing module 7 is configured to be connectable to the pressure sensor P and the magnetic sensor by the flexible cable 51, and is able to receive data from the pressure sensor P and the magnetic sensor.

The discrimination processing unit 71 compares a predetermined threshold value stored in a reference table or the like with the detected value of the pressure detected by the pressure sensor P, and thereby executes a process of discriminating the abnormality of the fluid control device V1 caused by the leaks of the fluid to the closed space S2. That is, during a normal usage, a limit value of the pressure in the closed space S2, assumed by the opening and closing of the valve of the fluid control device V1, is set as a predetermined threshold value. Then, when the detected value of the pressure in the closed space S2 exceeds the threshold value, it is discriminated that an abnormality has occurred in the fluid control device V1. The rationality of such discrimination is that the detected value of the pressure in the closed space S2 is regarded as exceeded the threshold value as a result of an increase of the pressure in the closed space S2 due to the leaks of the fluid to the closed space S2 for the damage of the diaphragm 22 or the like, or a decrease of the pressure in the closed space S2 due to a decompression in the flow path.

The communication processing unit 72 is a functional unit for executing a process of transmitting the discrimination result by the discrimination processing unit 71 to the external terminal 8 connected via the connector 53.

In the present embodiment, a processing result by the discrimination processing unit 71 is transmitted to the external terminal 8 via the connector 53, but the communication processing unit 72, for example, is constituted with a wireless LAN, Bluetooth (registered trademark), an infrared communication, or Zigbee (registered trademark) and the like, and the processing result may be transmitted by wireless communication.

Further, when another terminal is always connected to the connector 53, the communication processing unit 72 may transmit the discrimination result by the discrimination processing unit 71 at a predetermined cycle set arbitrarily, such as one hour or one day. On this respect, it is difficult to detect the moment of a slight leak of fluid, but if it is several days or so, it can be detected because the pressure increases. On the other hand, since the closed space S2 is an airtight space, it is unlikely that a problem will occur immediately even if a minute leak occurs. Therefore, there is no problem even if transmission is performed according to a predetermined cycle. Furthermore, when information transmission is performed in a predetermined cycle as described above, power consumption can be suppressed.

Further, when a plurality of fluid control device V1 are integrated to constitute the fluid controller, the communication processing unit 72 of each fluid control device V1 can transmit at different timings, together with of a self-identification information capable of identifying 8 itself with respect to the external terminal 8, the discrimination result by the discrimination processing unit 71 for the each fluid control device V1.

Since self-identification information capable of individually identifying the fluid control device V1 is transmitted to the external terminal 8, an abnormality occurring in any one of the plurality of the fluid control device V1 constituting the fluid controller can be discriminated.

In addition, by transmitting the determination result to the external terminal 8 at different timings for each fluid control device V1, it is possible to avoid the problem of packet collision, and it is also possible to prevent processing overload as compared with a situation where the transmission is made all at once. Furthermore, unlike in the case of transmissions made all at once, it is not necessary to change the radio channel used for data transmission for each of the fluid control device V1, and therefore it is not necessary to prepare many channels. In particular, when a connecting means of the fluid control device V1 and the external terminal 8 is configured by Bluetooth (registered trademark), a number of simultaneously connected devices is limited (usually seven), and therefore by changing the transmission timing, a number of the fluid control device V1 can exceed the number simultaneously connected devices.

The external terminal 8 is a so-called personal computer or a server, or a portable terminal capable of transmitting, receiving, and processing data, and includes hardware resources such as a CPU, a computer program executed by the CPU, a RAM (Random Access Memory) or ROM (Read Only Memory) storing computer programs or predetermined data, and an external storage such as a hard disk drive.

The external terminal 8 has a communication processing unit for receiving the determination result of the fluid leaking to the closed space S2 of the fluid control device V1. In response to a request from a terminal used by an administrator or a supervisor of the fluid control device V1, the information received from the fluid control device V1 is appropriately provided to a terminal used by the supervisor or the like.

The fluid control device V1 having the above configuration can detect the abnormality of the fluid control device V1 caused by the fluid leaks to the closed space S2 based on a comparison between the pressure in the closed space S2 detected by the pressure sensor P and the predetermined threshold value.

In addition, since the information regarding the abnormalities of the fluid control device V1 is collected in the external terminal 8, the supervisors or the like of the fluid control device V1 can monitor the operating status of the fluid control device V1 without burden.

Furthermore, since the fluid control device V1 detects the pressure in the closed space S2 and detects the abnormalities by comparing the predetermined threshold value with the detected value, it is possible to detect the abnormality even if the closed space S2 becomes a negative pressure.

It should be noted that such a functional configuration is an example, the discrimination processing unit 71 may be provided in the external terminal 8 to transmit the operation information of the fluid control device V1, such as the detected value of the pressure sensor P and the like, to the external terminal 8, and various mechanical configurations are possible.

Example 2

Next, a fluid control device according to a second embodiment of the present invention will be described.

Figure 7:
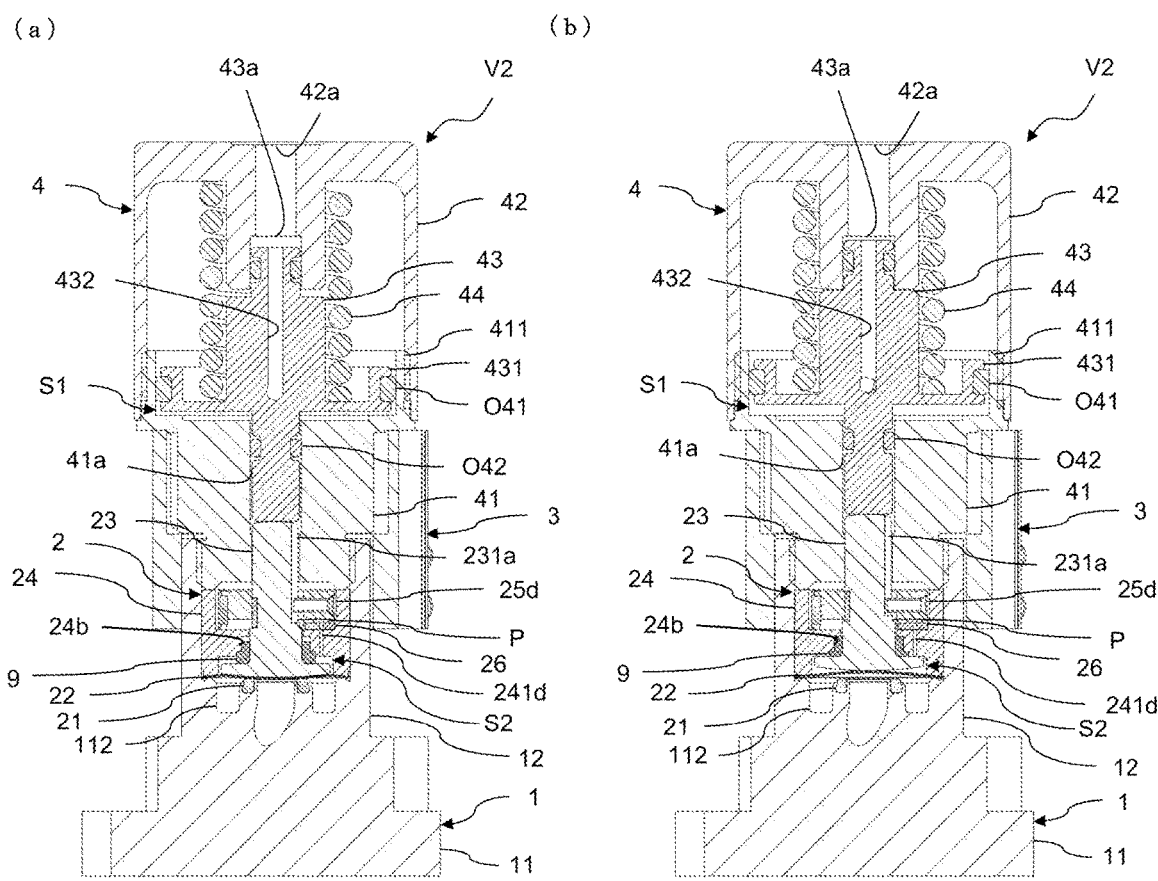
FIG. 7 is a diagram illustrating a cross-sectional view taken along line A-A of an internal structure of the fluid control device according to a second embodiment of the present invention, and (a) is illustrating a closing valve state and (b) is illustrating an opening valve state.
Figure 8:
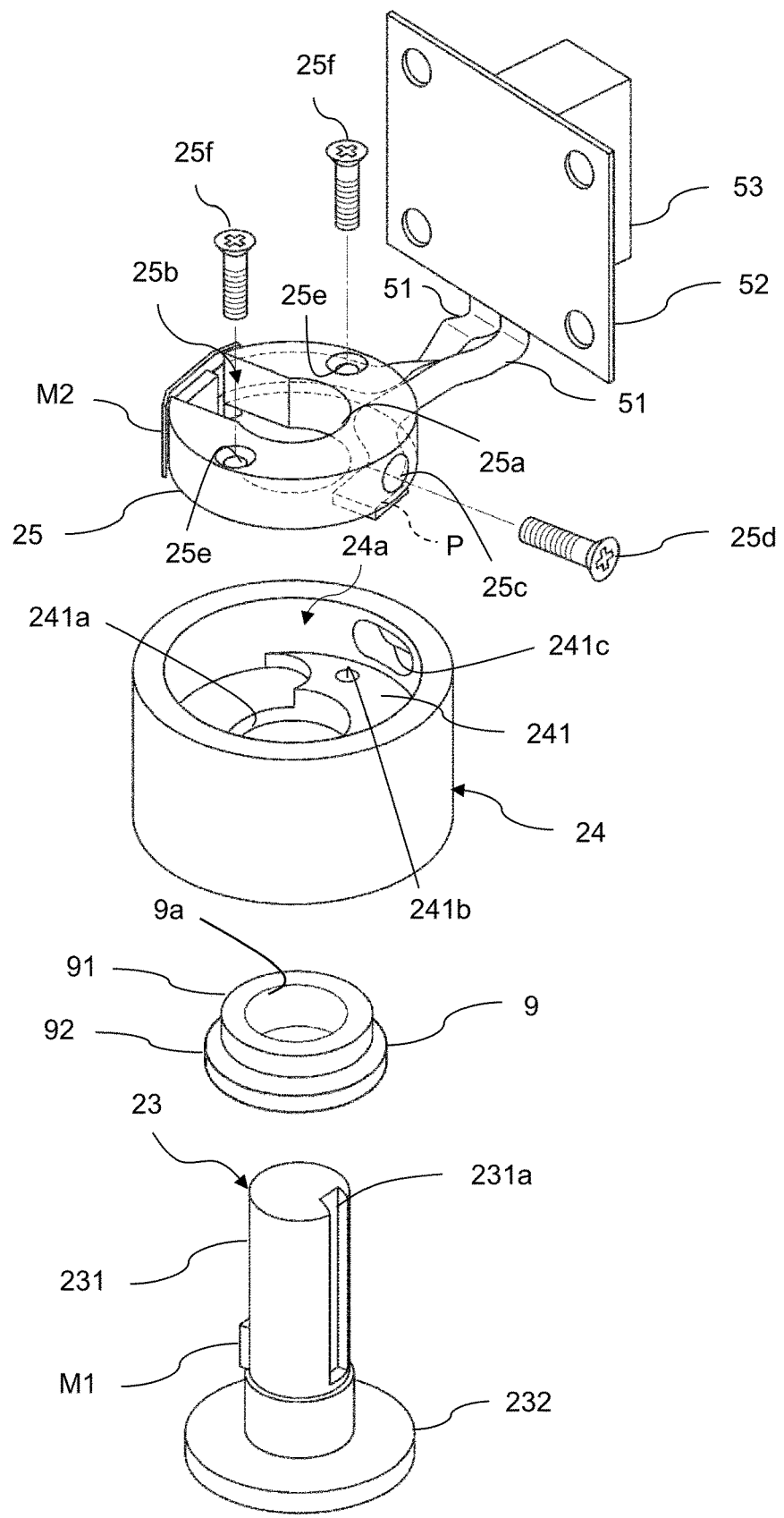
FIG. 8 is a diagram illustrating an exploded perspective view of the fluid control device according to a second embodiment of the present invention.

As illustrated in FIG. 7 and FIG. 8, a fluid control device V2 according to the present embodiment includes a storing part 24b storing an elastic body 9 in the bonnet 24.

In the description of the fluid control device V2 according to the present embodiment, the fluid control device V2 is referred to as a modification of the fluid control device V1 according to the first embodiment described above, members having the same function and configuration are designated by the same reference numerals as those of the fluid control device V1, and the description thereof will be omitted.

The bonnet 24 in the present embodiment is provided with a substantially concave storing part 24b opening toward the closed space S2 side and storing the elastic body 9 from an opening. In particular, in the present embodiment, the storing part 24b forms a part of the penetration hole 241a provided in the partition 241 of the bonnet 24, has a diameter larger than other parts of the penetration hole 241a, and has a diameter larger than the diameter of the base body 231 of the diaphragm retainer 23.

Similar to the first embodiment described above, it is preferable that the increased diameter portion 232 of the diaphragm retainer 23 defines the top dead center of the piston 43 that vertically moves in accordance with opening and closing of the fluid control device V1.

Elastic Body 9

Similar to the elastic body 6 described above, the elastic body 9 is a member that elastically expands and deflates in response to an external force and is made of a porous soft resin or the like having an external surface coated with a non-porous material. Further, also in this embodiment, the penetration hole 9a, which is formed in a substantially ring shape and in which the base body 231 of the diaphragm retainer 23 is penetrated in a center, is provided.

On the other hand, the elastic body 9 of the present embodiment includes a sealing part 91 stored in the storing part 24b at a natural state and an expanding/deflating part 92 protruded from the storing part 24b and elastically expanding and deflating between the increased diameter portion 232 of the diaphragm retainer 23 and the partition 241 of the bonnet 24.

The sealing part 91 has a substantially ring shape that conforms to a shape of the storing part 24b. The sealing part 91 seals between the diaphragm retainer 23 and the bonnet 24 while being stored in the storing part 24b to ensure the airtightness of the closed space S2, and functions as the O-ring O2 constituting the fluid control device V1 according to the first embodiment described above.

As a result, in this embodiment, it is not necessary to provide the O-ring O2 included in the fluid control device V1 according to the first embodiment. However, it does not prevent the O-ring O2 from being provided separately, and the O-ring O2 may be provided as in the first embodiment.

The expanding/deflating part 92 has a substantially ring shape like the sealing part 91, but has a diameter larger than that of the storing part 24b and the sealing part 91.

The expanding/deflating part 92 is interposed between the increased diameter portion 232 of the diaphragm retainer 23 and the partition 241 of the bonnet 24 while the base body 231 of the diaphragm retainer 23 is penetrated in the penetration hole 9a, and elastically expands and deflates as the diaphragm retainer 23 vertically moves. In other words, when the valve of the fluid control device V2 is opened and the diaphragm retainer is detached from the diaphragm 22, it is compressed and deflated between the increased diameter portion 232 of the diaphragm retainer 23 and the partition 241 of the bonnet 24. On the other hand, when the valve of the fluid control device V2 is closed, the diaphragm retainer 23 is brought into contact with the diaphragm 22, and the increased diameter portion 232 of the diaphragm retainer 23 is detached from the partition 241 of the bonnet 24, it is released from the compressed state, expands, and returns to a natural state before the compression.

In the present embodiment, the elastic body 9 is formed in the ring shape so that the diaphragm retainer 23 can be inserted into the penetration hole 9a, but regardless of this, it may have other shapes as long as the expanding/deflating part 92 is protruded from the storing part 24b and elastically expands and deflates in response to a pressing force from the increased diameter portion 232 of the diaphragm retainer 23. For example, an outer shape may be rectangular, or may be configured as an aggregation of a plurality of elastic members. Further, the expanding/deflating part 92 may have the same diameter as the storing part 24b and the sealing part 91, and the outer peripheral surfaces of the sealing part 91 and the expanding/deflating part 92 may be configured to be flat.

Further, in the storing part 24b, the configuration of the elastic body 9 including the sealing part 91 and the expanding/deflating part 92 does not exclude a configuration that a part or all of the expanding/deflating part 92 is stored in the storing part 24b. Therefore, when the fluid control device V2 is opened, a part or all of the expanding/deflating part 92 of the elastic body 9 may be elastically deformed by the pressing force of the diaphragm retainer 23 and may be stored in the storing part 24b.

Further, if the O-ring O2 is provided in the fluid control device V1 according to the first embodiment, the elastic body 9 may have only the expanding/deflating part 92 without having the sealing part 91. In this case, when the fluid control device V2 is opened, a part or all of the elastic body 9 is stored in the storing part 24b due to the pressing force from the diaphragm retainer 23.

Further, the elastic body 9 is stored in the storing part 24b, but may form a gap on a side opposite to the closed space S2 (in the back of the storing part 24b) to be stored in the storing part 24b in the natural sate while the valve is closed. As a result, the elastic body 9 fills the gap and is stored in the storing part 24b when the valve is opened, but the elastic body 9 protrudes greatly into the closed space S2 to be able to reduce the volume of the closed space S2 when the valve is closed.

The fluid control device V2 according to the present embodiment may seal between the diaphragm retainer 23 and the bonnet 24 and may reduce the volume of the gas occupied in the closed space S2 by an amount of the elastic body 9.

REFERENCE SIGNS LIST 1 valve body
2 bonnet part 21 seat
22 diaphragm
23 diaphragm retainer
231 base body
232 increased diameter portion
24 bonnet
24a recess
24b storing part
241 partition
241a penetration hole
25 bonnet wall
3 cover part
4 actuator part
51 flexible cable
52 circuit board
53 connector
6 elastic body
6a penetration hole
7 processing module
8 external terminal
9 elastic body
9a penetration hole
91 sealing part
92 expanding/deflating part
M1 magnet
M2 magnetic body
O1, O2 O-ring
P pressure sensor
S1 driving pressure introduction chamber
S2 closed space
V1, V2 fluid control device

The invention claimed is:

1. A fluid control device, detecting pressure in a closed space isolated from a flow path, comprising:

a valve body in which the flow path is formed;

an isolation member allowing or blocking fluids in the flow path and isolating the closed space from the flow path;

a bonnet arranged on the valve body, forming the closed space between the isolation member, and providing a penetration hole connected to the closed space and penetrated to be able to vertically move a diaphragm retainer;

the diaphragm retainer vertically moving in the penetration hole to press the isolation member and providing an increased diameter portion not to be removed from the penetration hole;

a pressure sensor detecting a pressure inside of the closed space; and an elastic body interposing between the increased diameter portion of the diaphragm retainer and the bonnet inside of the closed space and elastically expanding and deflating between the increased diameter portion of the diaphragm retainer and the bonnet as the diaphragm retainer vertically moves, wherein the bonnet is provided with a storing part opening on a side of the closed space and storing the elastic body.

2. The fluid control device according to claim 1, wherein the elastic body expanding and deflating as the diaphragm retainer vertically moves and elastically deforming during compression to be stored in the storing part.

3. The fluid control device according to claim 2, wherein the storing part is configured as an increased diameter portion, among the penetration hole, in a vicinity of the closed space, and the elastic body seals an inner peripheral surface of the penetration hole and the diaphragm retainer.

4. The fluid control device according to claim 2, wherein the elastic body forms a gap on a side opposite to the closed space and is stored in the storing part at a natural state.

5. The fluid control device according to claim 2, wherein a position of the increased diameter portion of the diaphragm retainer, vertically moving in the closed space, defines a top dead center of a piston interlocked with the diaphragm retainer.

6. The fluid control device according to claim 2, further comprising a sealing member sealing an inner peripheral surface of the penetration hole and the diaphragm retainer in a vicinity of the closed space.

7. The fluid control device according to claim 1, wherein a position of the increased diameter portion of the diaphragm retainer, vertically moving in the closed space, defines a top dead center of a piston interlocked with the diaphragm retainer.

8. The fluid control device according to claim 1, further comprising a sealing member sealing an inner peripheral surface of the penetration hole and the diaphragm retainer in a vicinity of the closed space.

* * * * *